United States Patent
Laor (10) Patent No.: US 9,012,092 B2
(45) Date of Patent: Apr. 21, 2015

(54) FIBER FELT CAPACITORS AND BATTERIES

(75) Inventor: Herzel Laor, Boulder, CO (US)

(73) Assignee: Laor Consulting LLC, Denver, CO (US)

( * ) Notice: Subject to any disclaimer, the term of this patent is extended or adjusted under 35 U.S.C. 154(b) by 13 days.

(21) Appl. No.: 14/008,551

(22) PCT Filed: Apr. 4, 2012

(86) PCT No.: PCT/IB2012/051646
§ 371 (c)(1),
(2), (4) Date: Sep. 29, 2013

(87) PCT Pub. No.: WO2012/137141
PCT Pub. Date: Oct. 11, 2012

(65) Prior Publication Data
US 2014/0030604 A1    Jan. 30, 2014

Related U.S. Application Data

(60) Provisional application No. 61/471,576, filed on Apr. 4, 2011.

(51) Int. Cl.
*H01M 4/80* (2006.01)
*H01G 9/00* (2006.01)
*H01G 4/06* (2006.01)
(Continued)

(52) U.S. Cl.
CPC ............... *H01G 9/042* (2013.01); *H01G 9/025* (2013.01); *H01G 9/04* (2013.01); *H01G 9/048* (2013.01); *H01G 11/24* (2013.01); *H01G 11/40* (2013.01); *H01G 11/56* (2013.01); *H01M 4/02* (2013.01); *H01M 4/0402* (2013.01); *H01M 4/366* (2013.01); *H01M 2300/0094* (2013.01); *Y02E 60/13* (2013.01); *H01G 11/30* (2013.01); *H01M 4/806* (2013.01)

(58) Field of Classification Search
CPC ......... H01G 9/025; H01G 9/04; H01G 9/048; H01G 11/24; H01G 11/40; H01G 11/56; H01G 9/042; H01G 11/30; H01M 4/02; H01M 4/0402; H01M 4/366; H01M 4/806
USPC ................... 429/235; 361/500, 502, 523, 524
See application file for complete search history.

(56) References Cited

U.S. PATENT DOCUMENTS 5,156,899 A    10/1992   Kistrup et al.
5,217,526 A *  6/1993    Fife ................................ 75/229
(Continued)

FOREIGN PATENT DOCUMENTS

DE    19711857       9/1998
EP    0449145        10/1991
JP    2005203238     7/2005

OTHER PUBLICATIONS

International Search Report dated Aug. 3, 2012 for PCT application PCT/IB2012/051646, international filing date Apr. 4, 2012.

*Primary Examiner* — Muhammad Siddiquee
(74) *Attorney, Agent, or Firm* — A.C. Entis-IP Ltd.

(57) ABSTRACT

An embodiment of the invention relates to providing an electrical component that provides an electrical functionality, the component comprising: a fiber felt comprising a tangle of fibers and characterized by a fill factor; and at least two layers of material formed on the fibers that contribute to providing the electrical functionality.

23 Claims, 6 Drawing Sheets

(51) Int. Cl.
*H01G 9/042* (2006.01)
*H01G 9/025* (2006.01)
*H01G 9/04* (2006.01)
*H01G 9/048* (2006.01)
*H01G 11/24* (2013.01)
*H01G 11/40* (2013.01)
*H01G 11/56* (2013.01)
*H01M 4/02* (2006.01)
*H01M 4/04* (2006.01)
*H01M 4/36* (2006.01)
*H01G 11/30* (2013.01)

(56) References Cited

U.S. PATENT DOCUMENTS

| | | | | |
|---|---|---|---|---|
| 6,449,139 | B1* | 9/2002 | Farahmandi et al. | 361/502 |
| 7,344,776 | B2* | 3/2008 | Kollmann et al. | 428/379 |
| 7,598,001 | B2* | 10/2009 | Tsuda et al. | 429/236 |
| 2003/0128499 | A1* | 7/2003 | Watanabe et al. | 361/502 |
| 2007/0298302 | A1* | 12/2007 | Oschmann | 429/33 |
| 2010/0259866 | A1* | 10/2010 | Shaffer et al. | 361/502 |
| 2012/0321913 | A1* | 12/2012 | Hua et al. | 429/7 |

\* cited by examiner

FIG.3B

FIBER FELT CAPACITORS AND BATTERIES

RELATED APPLICATIONS

The present application is a US National Phase of PCT Application No. PCT/IB2012/051646, filed on Apr. 4, 2012, which claims benefit under 35 U.S.C. §119(e) of U.S. Provisional Application 61/471,576 filed on Apr. 4, 2011 the disclosure of which is incorporated herein by reference.

RELATED APPLICATIONS

The present application claims the benefit under 35 U.S.C. 119(e) of U.S. Provisional Application 61/471,576 filed on Apr. 4, 2011, the disclosure of which is incorporated herein by reference.

FIELD

Embodiments of the invention relate to capacitors and batteries comprising layers of material formed on fiber felts

BACKGROUND

Capacitors are passive, two terminal electrical devices for storing energy in electric fields and are commonly found in electrical and electronic circuits used in a wide variety of applications. They typically comprise a dielectric sandwiched between two generally parallel conductors and store energy in an electric field generated in the dielectric by negative charge accumulated on one of their conductors and positive charge accumulated on the other of their conductors. By way of example, capacitors are used to reduce ripple in voltage provided by power supplies, to multiply voltage in charge pumps, to isolate signal circuits from direct current (DC) signals and voltages, and to filter out noise in signal processing circuits. Capacitors function as snubbers in switching circuits, pulse power sources in weapons systems, and energy storage components in solid state circuits.

Electrical features of a capacitor are characterized by capacitance "C", which is a coefficient that relates an amount of energy stored in an electric field in the dielectric of the capacitor to voltage between the capacitor conductors. If "E" represents an amount of energy stored in the capacitor for a given voltage difference "V" between the conductors the stored energy is given by an expression $E=(\frac{1}{2})CV^2$. An amount of charge "Q" that resides on the conductors is related to V by an expression $Q=CV$.

Capacitance C is determined by geometric features of the capacitor and permittivity of the dielectric. Assuming that the conductors are parallel planar conductors separated by a distance "d" and have area "A", and that the relative permittivity of the dielectric is "$\in_r$", C may be given by an expression $C=\in_o\in_r A/d$, where $\in_o$ is the permittivity of free space. In the MKS (meter, kilogram, second) system of units, $\in_o=10^{-9}/(36\pi)$, d is in meters (m), area A is in square meters ($m^2$) and C is given in Farads (F). A useful figure of merit of a capacitor is its specific capacitance, herein represented by "C*", which is the capacitor's capacitance per unit volume of the capacitor. The specific capacitance provides an indication of how much space a capacitor occupies in a circuit for an amount of capacitance it provides.

As electronic components and circuits that comprise the components decrease in size and their three dimensional volumes shrink it is generally advantageous that capacitors also shrink and provide increasing specific capacitance. However, as capacitors shrink and their specific capacitances increase, for a given desired range of operating voltages, magnitudes of electric fields generated between their conductors, in their dielectrics, and between their terminals, increase. As a result, it becomes increasingly difficult to configure high specific capacitance capacitors to support the large fields they generate for operating voltage ranges and breakdown voltages required by many applications.

A product of an operating voltage of a capacitor and its specific capacity, may be used to provide a figure of merit for a capacitor that is responsive to both the specific capacitance and operating voltage of the capacitor. The product, hereinafter referred to as a "specific operating charge" Q*, is equal to a charge a capacitor stores at its operating voltage per unit volume of the capacitor. For convenience of presentation, specific operating charge is given below in units of Volts×μF/$mm^3$ (microfarad/cubic millimeter), rather than coulombs per $m^3$ (cubic meter).

Electrolytic capacitors, which comprise a metal terminal typically formed from Aluminum or Tantalum, on which a thin dielectric layer of an oxide of the metal is grown by an electrolytic process, are often used for applications that require high specific capacitance. By way of example, KEMET Electronic Corp markets a 1000 μF (microfarad) Tantalum electrolytic capacitor under the catalog number "T530X108M003AS" for surface mount applications. The KEMET capacitor operates at 2 volts, has dimensions 7.3 mm×4.3 mm×4.3 mm and therefore a specific capacitance equal to about 7.4 μF/$mm^3$, and a specific operating charge equal to about 14.8 V μF/$mm^3$. Whereas electrolytic capacitors provide relatively large capacitances their oxide-metal interfaces are rectifying. As a result they are generally polar capacitors having a positive terminal and a negative terminal and they must be connected to a circuit so that voltage on the positive terminal is always greater than or equal to a voltage on the negative terminal.

Applications that require very high capacitances and high specific capacitances may use electrochemical capacitors, also referred to as, super-capacitors, ultra-capacitors, or electric double-layer capacitors. The electrochemical capacitors comprise electrodes in contact with a liquid or solid electrolyte. As the name "electric double-layer capacitor" implies, these capacitors store energy in electric fields generated between two layers of opposite charge that are separated by very small distances. The charge double-layers may be separated by distances between about 0.3 nm (nanometers) to about 0.5 nm and are formed at the interfaces between the capacitors electrodes and the electrolyte.

As a result of the very small separation distances of the charge layers in their double-layers, electrochemical capacitors may have very large capacitances, and very large specific capacitances. An electrochemical capacitor may have capacitance of hundreds of Farads and a specific capacitance of a few milliFarads per cubic millimeter (mF/$mm^3$). However, their operating voltages are limited by breakdown voltages of their electrolytes, which are typically between 1 and 3 volts and they exhibit relatively large effective series resistance (ESR), which limits their operational frequency bandwidths.

Batteries have structures similar to that of capacitors and generally comprise two terminals coupled respectively to an anode electrode and a cathode electrode that sandwich between them an electrolyte. However, whereas in capacitors materials in the electrodes do not chemically react with material in the electrolyte, in batteries materials in the anode and cathode undergo oxidation and reduction reactions to store electrical energy and deliver stored electric energy to a load.

SUMMARY

An aspect of the invention relates to providing a capacitor, hereinafter referred to as a "fiber felt capacitor", characterized by a relatively high specific capacitance that comprises a layer of a dielectric material sandwiched between first and second conductors formed by atomic layer deposition (ALD) on a fiber felt "scaffolding".

A fiber felt refers to a material comprising randomly oriented, entangled, synthetic or natural fibers. The fibers may by way of example, comprise conductive and/or non-conductive fibers and may be formed from any of a variety of materials, including plastic, glass, ceramic, and/or metal. Any of various methods, such as by way of example, turning, drawing, cutting, chopping, and solgel and/or aerogel processes may be used to produce the fiber felt. A fiber felt may be configured to have different surface areas per unit volume by adjusting a fraction, hereinafter referred to as a fill factor (FF), of a unit volume of the fiber felt that is occupied by its fibers. For a given fiber cross section, the surface area per unit volume of the fiber felt is proportional to the fill factor.

For use as scaffolding for a fiber felt capacitor in accordance with an embodiment of the invention, a fiber felt is configured having a relatively large surface area per unit volume. In an embodiment of the invention, the first conductor of the fiber felt capacitor is formed as a layer directly on the surfaces of the felt fibers in the scaffolding or on at least one substrate layer formed on the felt fibers. In embodiments of the invention for which the felt fibers are formed from a conductive material, optionally, the fibers may function as the first conductor.

Each of the conductors and the dielectric layer of the fiber felt capacitor that are formed on the fibers of the scaffolding have surface areas at least as large as that of the fibers on which they are formed. As a result, per unit volume, the fiber felt capacitor in accordance with an embodiment of the invention has a relatively large value for the surface area "A" that appears in the expression for capacitance discussed above. In addition, forming the dielectric layer by ALD provides a relatively high integrity uniform dielectric layer that may have a relatively small value for thickness, "d", of the dielectric layer that appears in the expression for the capacitance. The large surface area, A, per unit volume, and small thickness, d, result in the fiber felt capacitor having a relatively large specific capacitance. The large surface area provides the fiber felt capacitor with a relatively large specific operating charge.

In an embodiment of the invention, the fiber felt capacitor comprises a first terminal that is electrically connected to the first conductor prior to forming the dielectric layer. Optionally, the first terminal comprises a planar conducting plate brazed to the first conductor. In an embodiment of the invention, the fiber felt capacitor comprises a second electrical terminal, which is optionally brazed to the second conductor to electrically connect the second terminal to the second conducting layer. Optionally, the second terminal comprises a planar conducting plate parallel to the plate of the first terminal.

In an embodiment of the invention, a spacer formed from an insulating material separates the first and second terminals and surrounds the fiber felt scaffolding and the layers formed thereon. The insulating spacer may be formed prior to forming the dielectric layer or prior to forming the second conductor.

Hereinafter, a fiber felt scaffolding comprised in a fiber felt capacitor or other component in accordance with an embodiment of the invention may also be referred to simply as a fiber felt. Unless otherwise specified, a given layer of material said to be formed "on" fibers comprised in a fiber felt in accordance with an embodiment of the invention may be formed directly on the fibers or on a layer of material intermediate the given layer of material and the fibers.

An aspect of some embodiments of the invention relate to providing an electrochemical fiber felt capacitor comprising layers of material formed using ALD processes on a fiber felt. The layers include a solid electrolyte sandwiched between an anode layer and a cathode layer that store energy in electric fields generated by electric double layers at the interfaces between the electrolyte and the anode and cathode when a voltage difference is applied between the anode and cathode.

An aspect of some embodiments of the invention relate to providing a fiber felt battery in which layers of material are formed using ALD processes on a fiber felt that include a solid electrolyte layer sandwiched between an anode layer and a cathode layer. The layers comprise active materials that undergo oxidation reactions and reduction reactions at the anode and cathode respectively to support current that the battery provides to a load.

There is therefore provided in accordance with an embodiment of the invention, an electrical component that provides an electrical functionality, the component comprising: a fiber felt comprising a tangle of fibers and characterized by a fill factor; and at least two layers of material formed on the fibers that contribute to providing the electrical functionality. Optionally, the layers are formed by atomic layer deposition (ALD).

Additionally or alternatively, the fibers have a radius less than or equal to about 1 micron. Optionally, the fibers have a radius less than or equal to about 500 nm (nanometers). Optionally, herein the fibers have a radius less than or equal to about 100 nm.

In an embodiment of the invention, the fill factor is greater than or equal to about 0.4. Optionally, the fill factor is greater than or equal to about 0.5. Optionally, the fill factor is greater than or equal to about 0.6.

In an embodiment of the invention, the at least two layers comprise a first layer formed from an electrically conducting material. Optionally, the at least two layers comprise a second layer that underlies the first layer and is formed from a dielectric material. Optionally the electrical component comprises a conductor underlying the second layer. Optionally, the conductor comprises a third layer underlying the second layer that is formed on the fibers from a conducting material. Alternatively or additionally, the fibers are formed from a metal and the conductor comprises the fibers.

In an embodiment of the invention the electrical component comprises a first terminal electrically connected to the first layer and a second terminal electrically connected to the conductor underlying the second layer.

In an embodiment of the invention the fill factor and layers formed on the fibers are configured to have a specific operating charge of the fiber felt that is greater than or equal to about 20 V$\mu$F/mm$^3$, wherein the specific operating charge is equal to an amount of charge stored per mm$^3$ of the fiber felt volume for a voltage between the first and second terminals that is about 0.6 times a voltage at which the dielectric layer between the first and second layers breaks down. Optionally, the specific operating charge is greater than or equal to about 120 $\mu$V$\mu$F/mm$^3$. Optionally, the specific operating charge is greater than or equal to about 600 V$\mu$F/mm$^3$.

In an embodiment of the invention, the at least two layers comprise a second layer that underlies the first layer and is formed from a solid electrolyte. Optionally, the electrical component comprises a third layer underlying the second layer and wherein the second layer is contiguous and interfaces with the first layer and the second layer and when a voltage difference is applied between the first layer and the third layer, a charge double-layer is formed at the interfaces.

In an embodiment of the invention, the at least two layers comprise a battery anode layer contiguous with a solid electrolyte layer and in addition, a battery cathode layer contiguous with the solid electrode layer and wherein materials in the electrolyte react with materials in the anode and cathode to undergo oxidation and reduction reactions. Optionally, the battery cathode layer has thickness greater than or equal to about 100 nm. Alternatively or additionally, the battery anode layer has thickness greater than or equal to about 100 nm. In an embodiment of the invention, the solid electrolyte layer has thickness between about 10 nm and about 50 nm.

In the discussion, unless otherwise stated, adjectives such as "substantially" and "about" modifying a condition or relationship characteristic of a feature or features of an embodiment of the invention, are understood to mean that the condition or characteristic is defined to within tolerances that are acceptable for operation of the embodiment for an application for which it is intended.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF FIGURES

Non-limiting examples of embodiments of the invention are described below with reference to figures attached hereto that are listed following this paragraph. Identical structures, elements or parts that appear in more than one figure are generally labeled with a same numeral in all the figures in which they appear. Dimensions of components and features shown in the figures are chosen for convenience and clarity of presentation and are not necessarily shown to scale.

DETAILED DESCRIPTION

Figure 1A:
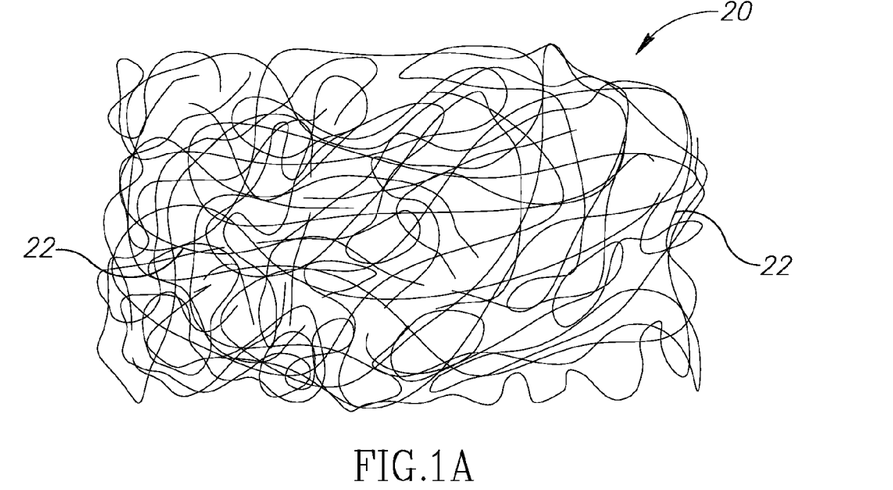
FIG. 1A schematically shows a fiber felt to be prepared for use as a scaffolding in providing a fiber felt capacitor in accordance with an embodiment of the invention.
Figure 1B:
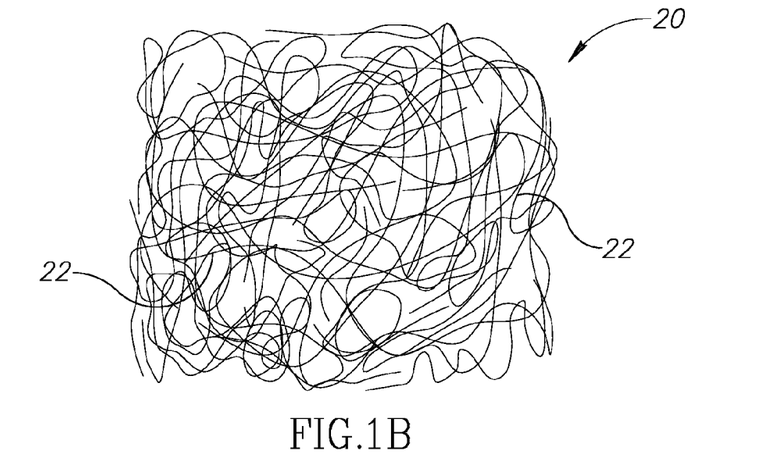
FIGS. 1B and 1C schematically show the fiber felt shown in FIG. 1A after preliminary processing to prepare the fiber felt for producing a fiber felt capacitor in accordance with an embodiment of the invention.
Figure 1C:
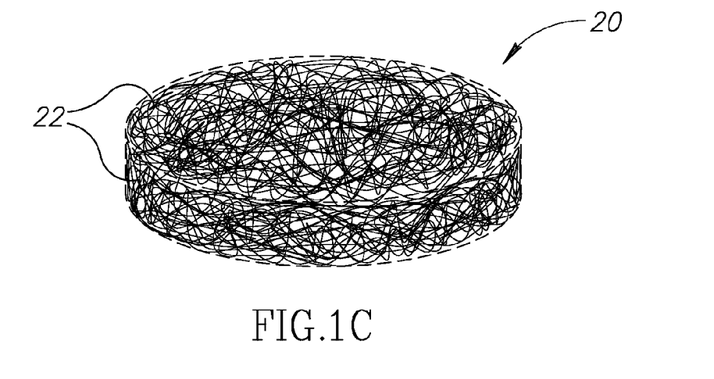

In the following detailed description an example of a process by which a fiber felt capacitor is produced in accordance with an embodiment of the invention is schematically illustrated in FIGS. 1A-1K and discussed with reference to the figures. A numerical example of a fiber felt capacitor produced in accordance with a process similar to that described with reference to FIGS. 1A-1K and details of features of the process are discussed following the discussion of FIGS. 1A-1K. SEM images of an actual fiber felt scaffolding before and after having formed on its fibers ALD layers to provide a fiber felt capacitor in accordance with an embodiment of the invention are shown in FIGS. 2A and 2B respectively. A discussion and examples of fiber felt electrochemical capacitors and fiber felt batteries in accordance with embodiments of the invention schematically shown in FIGS. 3A and 3B respectively follow the discussion of the production and specification of a fiber felt capacitor illustrated in FIGS. 1A-1K. Fiber felt FIG. 1A schematically shows a fiber felt 20 for use in producing a fiber felt capacitor 100, schematically shown in FIG. 1K, in accordance with an embodiment of the invention. Fiber felt 20 comprises a tangle of fibers 22 that are fused or bonded to each other at points at which fibers in the tangle touch. Fibers 22 may be any of various synthetic and/or natural fibers, and may be formed from any of a variety of materials, including by way of example, plastics, polymers, glasses, ceramics, and/or metals. The fibers may be bonded at contact points by sintering, or bonding with a suitable bonding agent. Optionally, fibers 22 have an average diameter greater than or equal to about 100 nm (nanometers). Optionally, the fibers have an average diameter equal to or greater than about 500 nm. In an embodiment, fibers 22 have an average diameter equal to or greater than about 1 μm.

Optionally, fiber felt 20 is a commercially available fiber felt that may be used for filtering a fluid. A fluid filtration fiber felt often has a relatively small fill factor to moderate a degree to which it may interfere with flow through the fiber felt of a fluid that the fiber felt is used to filter. The fill factor may be smaller than about 0.15, and is typically between about 0.10 and about 0.15.

In accordance with an embodiment of the invention, fiber felt 20 is trimmed and compressed to configure the fiber felt to a desired shape and increase its fill factor so that it has a surface area per unit volume sufficiently large to provide a fiber felt capacitor having a desired specific capacitance. FIG. 1B schematically shows a cross section of fiber felt 20 after the fiber felt has been trimmed to a desired size. Optionally, fiber felt 20 is trimmed to a shape of a circular disk. FIG. 1C schematically shows a perspective view of fiber felt 20 shown in FIG. 1B after it has been shaped to a circular disk and compressed to increase its surface area per unit volume. Optionally, fiber felt 20 is compressed to a degree so that it has a fill factor greater than or equal to about 0.40. Optionally, the fiber felt is compressed to a fill factor greater than or equal to about 0.50. In an embodiment of the invention fiber felt 20 is compressed to a fill factor greater than or equal to about 0.60.

Figure 1D:
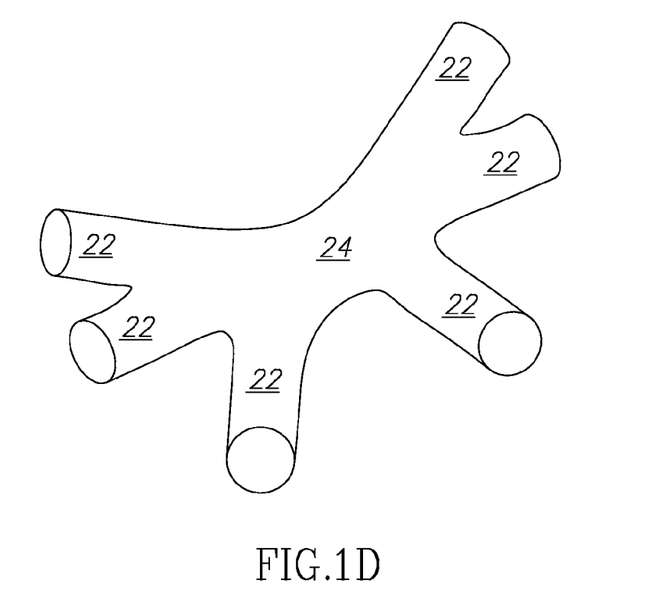
FIG. 1D schematically shows a greatly enlarged view of entangled fibers in the fiber felt following preliminary processing, in accordance with an embodiment of the invention.
Figure 2A:
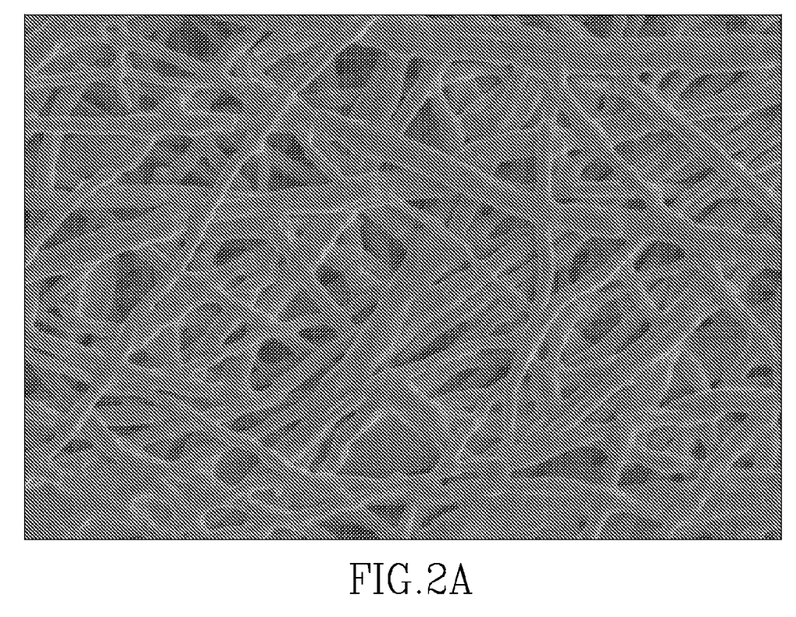
FIG. 2A shows a scanning electron microscope (SEM) image of a fiber felt comprising sintered 1 μm (micrometer) diameter stainless steel fibers for use as a scaffolding in a fiber felt capacitor, electrochemical capacitor, or a battery, in accordance with an embodiment of the invention.
Figure 2B:
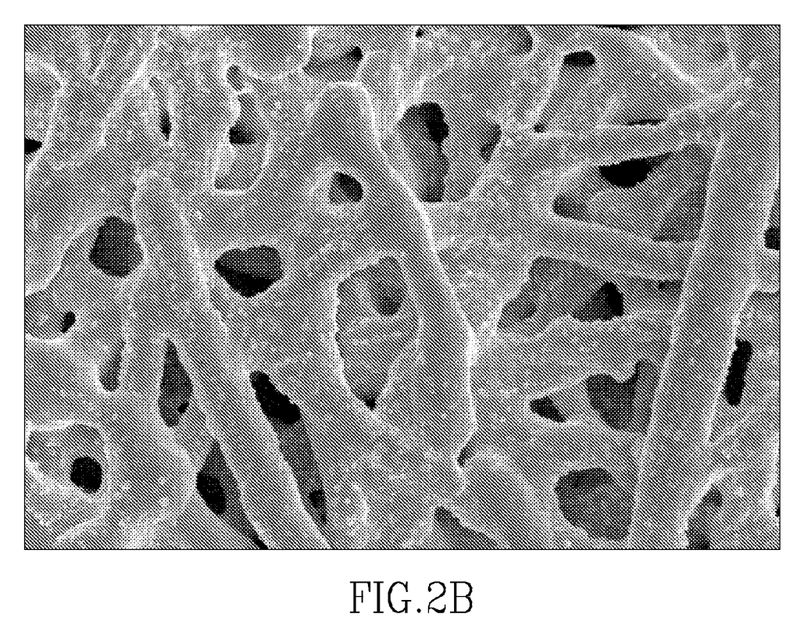
FIG. 2B shows a SEM image of the fiber felt scaffolding shown in FIG. 2A after the fibers have been coated by atomic layer deposition with layers for a capacitor, in accordance with an embodiment of the invention.

FIG. 1D schematically shows a greatly enlarged view of portions of entangled fibers 22 in fiber felt 20 after the fiber felt has undergone compression, as indicated by FIG. 1C referenced to FIG. 1B. Fibers 22 are fused or bonded together at a common contact region 24 and are shown severed to exhibit their cross sections.

Figure 1E:
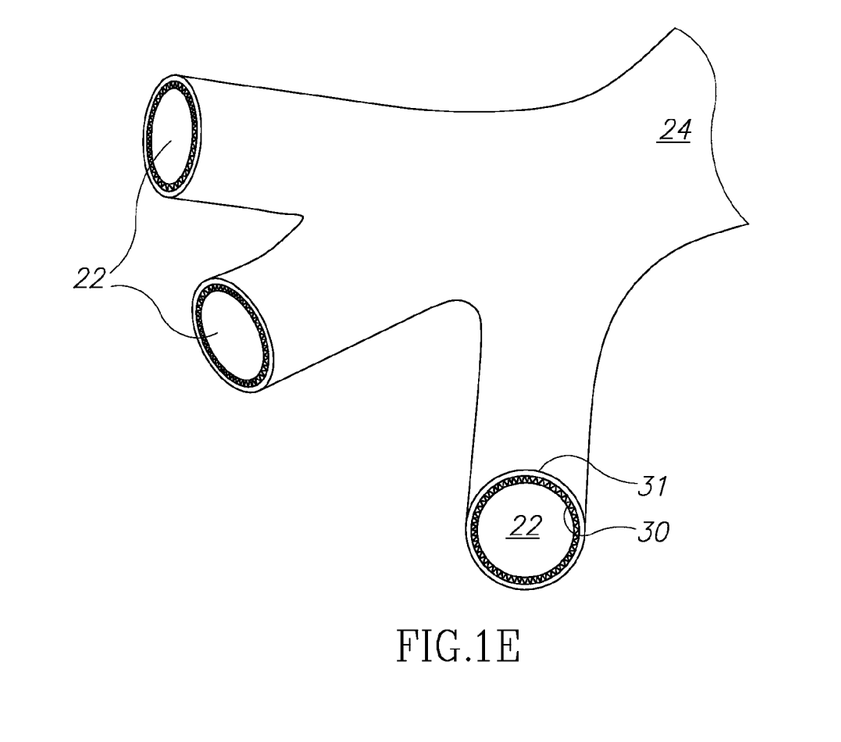
FIG. 1E schematically shows the entangled fibers shown in FIG. 1D after a substrate layer is formed on the fibers and a first conductor of the fiber felt capacitor is formed as a layer on the substrate layer, in accordance with an embodiment of the invention.
Figure 1F:
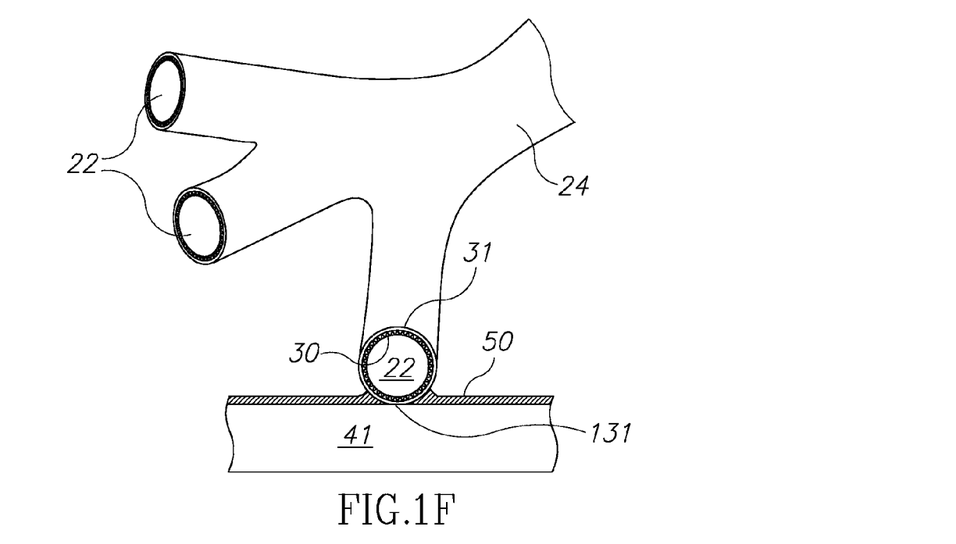
FIG. 1F schematically shows a first terminal of the fiber felt capacitor brazed to the entangled fibers shown in FIG. 1E, in accordance with an embodiment of the invention.
Figure 1G:
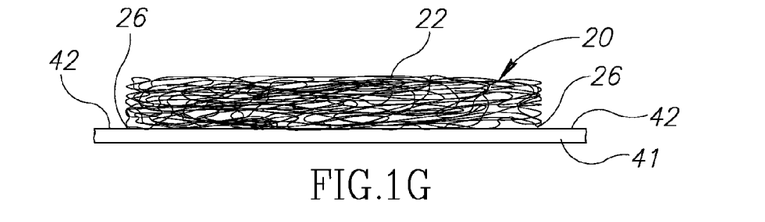
FIG. 1G schematically shows a cross section of the fiber felt scaffolding and the first terminal after brazing of the first terminal to the first conducting layer, in accordance with an embodiment of the invention.
Figure 1H:
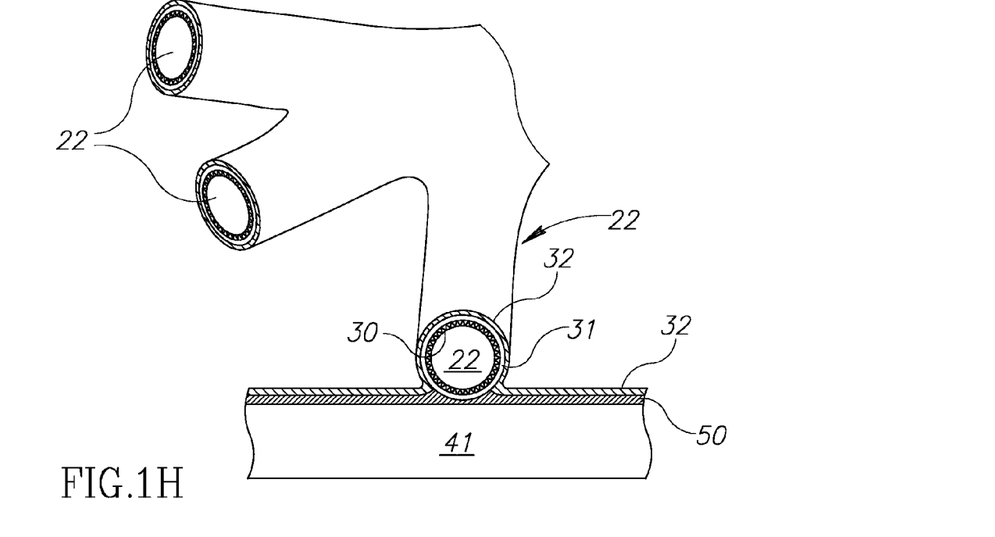
FIG. 1H schematically shows the entangled fibers shown in FIG. 1F after a dielectric layer of the fiber felt capacitor is formed on the first conducting layer shown in FIGS. 1E and 1F, in accordance with an embodiment of the invention.
Figure 1I:
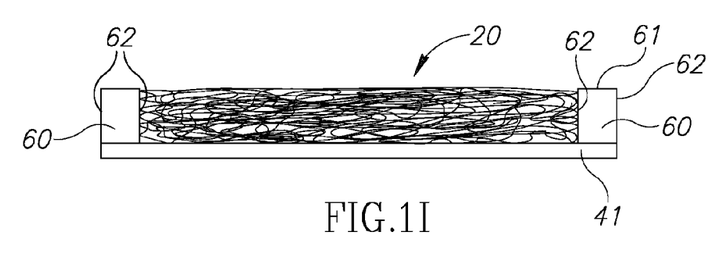
FIG. 1I schematically shows a cross section of the fiber felt scaffolding and the first terminal after formation of an insulating spacer on the first terminal, in accordance with an embodiment of the invention.
Figure 1J:
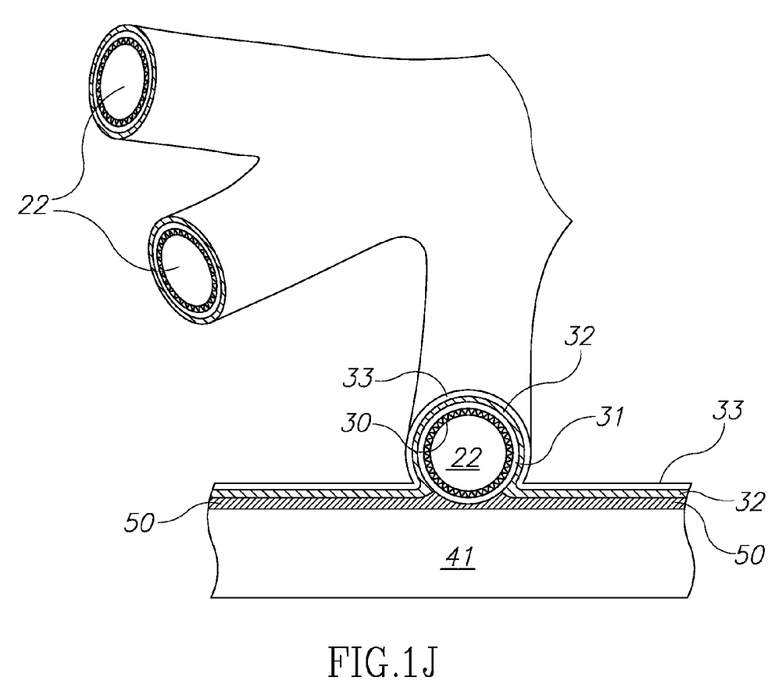
FIG. 1J schematically shows the entangled fibers shown in FIG. 1H after a second conductor of the fiber felt capacitor is formed as a layer on the dielectric layer shown in FIG. 1H, in accordance with an embodiment of the invention.
Figure 1K:
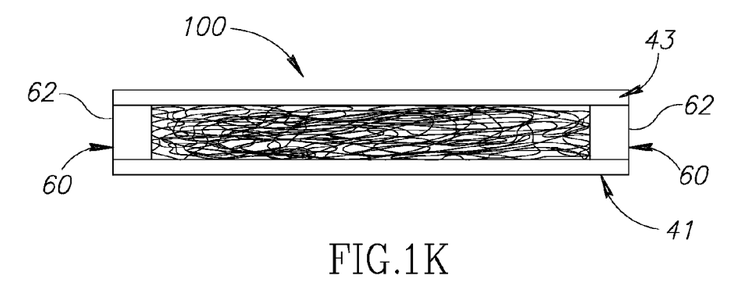
FIG. 1K schematically shows a cross section of the fiber felt scaffolding after the second conductor is formed and a second terminal brazed to the second conductor to complete the fiber felt capacitor, in accordance with an embodiment of the invention.

Following trimming compression and fusing or bonding, fibers 22 are optionally coated with a layer of material that provides an advantageous substrate on which to form a first conductor of fiber felt capacitor 100 (FIG. 1K). FIG. 1E schematically shows entangled fibers 22 shown in FIG. 1D following coating with a substrate layer 30 and formation of a conducting layer 31 on the substrate layer. Conducting layer 31 may function as a first conductor of the fiber felt capacitor and may be formed from any of various conducting materials such as by way of example, Tungsten Nitride (WN), Titanium Nitride (TiN), Tantalum Nitride (TaN), Copper (Cu), Platinum (Pt), Tungsten (W) and/or Silver (Ag). Optionally, layers 30 and 31 are formed by ALD. In embodiments of the invention for which fibers 22 are formed form a conducting material having suitable conductivity and resistance to oxidation, the fibers may function as the first conductor of fiber felt capacitor 100.

In an embodiment of the invention, following formation of conducting layer 31, a conducting terminal 41, schematically shown in cross section in FIG. 1F, is mechanically and electrically connected to conducting layer 31, optionally by brazing. During brazing a filler metal 50 is heated to wet and electrically and mechanically bond regions of conducting layer 31 and regions of terminal 41 that are in contact. In FIG. 1F a region 131 of conducting layer 31 located on a fiber 22 that is assumed to be in close proximity to terminal 41 is schematically shown wetted by filler metal 50. FIG. 1G schematically shows a "zoomed-out" cross section view of fiber felt 20 and terminal 41 after brazing. Optionally, as shown in FIG. 1G and figures that follow, terminal 41 extends beyond fiber felt 20 to form a shelf region 42 surrounding a "bottom" edge 26 of the fiber felt.

Following brazing, a dielectric layer 32 schematically shown in FIG. 1H is formed, optionally in an ALD process on conducting layers 31 formed on fibers 22 and on shelf region 42 of terminal 41. By way of example dielectric layer 32 may comprise $Al_2O_3$, $ZrO_2$, $HfO_2$, $SiO_2$, $SrTiO_3$, $BaTiO_3$ and/or $Ta_2O_5$. Optionally, subsequent to formation of dielectric layer 32, an insulating spacer 60, schematically shown in a cross section view of fiber felt 20 and terminal 41 in FIG. 1I is formed on shelf 42. Insulating spacer 60 has a top surface 61 and side surfaces 62 and may completely surround fiber felt 20 and have a height substantially equal to thickness of the fiber felt. Any of various insulating materials that are not damaged by processes in the production of fiber felt capacitor 100, such as a glass or plastic may be used to form insulating spacer 60. A second conducting layer 33, schematically shown in FIG. 1J, which functions as a second conductor of fiber felt capacitor 100 is formed, optionally by ALD, on dielectric layer 32 and on exposed surfaces of insulating spacer 60, such as top surface 61 and side surface 62 of the insulating spacer shown in FIG. 1I. Optionally, second conducting layer 33 comprises a conducting material from which first conducting layer 31 may be formed.

In an embodiment of the invention, a second terminal 43 schematically shown in a cross section view in FIG. 1K is brazed to second conducting layer 33 (FIG. 1J) to mechanically and electrically connect the second terminal to the second conducting layer and complete production of fiber felt capacitor 100.

By way of a particular numerical example, a fiber felt capacitor in accordance with an embodiment of the invention similar to fiber felt capacitor 100 (FIG. 1K) may be formed from a fiber felt 20 (FIG. 1A) having an initial fill factor about 0.20 and comprising fibers 22 having an average diameter equal to about 1 μm. Optionally, the fibers are formed from stainless steel 316. In an embodiment of the invention, the fiber felt is trimmed (FIG. 1B) and compressed (FIG. 1C) to form a disk shaped fiber felt scaffolding having a diameter of about 10 mm, thickness equal to about 1.0 mm, and fill factor equal to about 0.50. The compressed disk may be sintered in a vacuum furnace at a temperature of about 1020° C. (degrees Celsius) for about ten minutes to cause stainless steel fibers 22 in the disk to fuse in regions where they are in contact. FIG. 2A shows a scanning electron microscope (SEM) image of a region of a fiber felt scaffolding after sintering formed in accordance with an embodiment of the invention and comprising 1 μm diameter stainless steel 316 fibers.

In an embodiment of the invention, conducting layer 31, dielectric layer 32, and second conducting layer 33 are formed by ALD from Platinum (Pt), $Al_2O_3$ (alumina, or Aluminum oxide) and Pt respectively. Optionally, alumina dielectric layer 32 and conducting layers 31 and 33 have thickness equal to about 10 nm. Substrate layer 30 on which conducting layer 31 is formed is optionally produced from $Al_2O_3$ deposited on stainless steel fibers 22 by an ALD process. $Al_2O_3$ accelerates deposition of Pt in ALD processes. FIG. 2B shows a SEM image of a fiber felt scaffolding similar to that shown in FIG. 2A after forming layers 30-33 noted above using ALD, in accordance with an embodiment of the invention.

To minimize strain in and between various components of fiber felt capacitor 100 generated by changes in ambient and/or operating temperatures of the fiber felt capacitor it is advantageous that components of the fiber felt capacitor have coefficients of thermal expansion that are substantially the same and/or are relatively small. It is therefore generally advantageous that first and second terminals 41 and 43 (FIG. 1K) be formed from a same material from which fibers 22 are formed. In an embodiment of the invention similar to that discussed above for which fibers 22 are formed from stainless steel 316, which has a coefficient of thermal expansion equal to about $16.5 \times 10^{-6}$ mm/° C., optionally terminals 41 and 43 are also formed from stainless steel 316. Optionally, terminal 41 and 43 are formed from copper, which has a coefficient of thermal expansion equal to about $17 \times 10^{-6}$ mm/° C.

Brazing of terminals 41 or 43 to conducting layers 31 and 33 respectively may be performed with a filler metal that melts at a temperature below a temperature at which materials already integrated in the production of capacitor 100 at the time of brazing may be damaged. The filler metal should also be such that it itself is not damaged by a process in the production of the capacitor subsequent to brazing with the filler metal.

For example, silver melts at a temperature below the melting temperatures of stainless steel, alumina, and platinum and above temperatures used in ALD processes used to produce fiber felt capacitor 100. Silver also melts at a temperature above that which capacitor 100 may be subjected to in installing, for example by soldering, the fiber felt capacitor in a circuit. Silver is therefore a suitable candidate of use as a filler metal 50 to braze terminal 41. As for second terminal 43, a filler metal used to braze terminal 43 advantageously satisfies all the constraints that a filler used to braze terminal 41 satisfies and in addition should have a melting temperature lower than that of the filler metal used to braze terminal 41. Zinc satisfies the constraints satisfied by silver and has a melting temperature less than that of silver. Zinc is therefore a suitable candidate as a filler metal for brazing second terminal 43. It is noted that whereas in the above discussion pure metals were cited as filler metals, a filler metal is generally a composite of more than one metal tailored to melt at a desired temperature.

Insulating spacer 60 may be formed from any of various insulating materials that are not damaged at processing temperatures at which dielectric layer 32 and conducting layer 33 are formed or terminal 43 is brazed to conduction layer 33. Advantageously, the insulating materials have a coefficient of thermal expansion similar to that of stainless steel 316. ALD formation of the dielectric and conducting layers may be performed at temperatures between about 250° C. and about 300° C. Brazing of terminal 43 to conducting layer 33 with a zinc filler metal may be performed at a temperature of about 420° C. Various glasses and polymers are available that satisfy the temperature and coefficient of thermal expansion constraints noted above and may be used to provide insulating spacer 60.

Let "R" and "τ" represent the radius and thickness respectively of a disk shaped fiber felt scaffolding comprised in a fiber felt capacitor similar to fiber felt capacitor 100 in accordance with an embodiment of the invention, and let "FF" represent the fill factor of the fiber felt scaffolding 20. If the fibers in the fiber felt scaffolding have radius $\phi$ then a total length "L" of fiber 22 in the scaffolding may be estimated by an expression $L = FF(R^2\tau/\phi^2)$. A total area "A" of the surfaces of fibers 22 in the fiber felt scaffolding may then be estimated by an expression $A = 2\pi\phi FF(R^2\tau/\phi^2) = 2\pi FF(R^2\tau/\phi)$. If dielectric layer 32 has a thickness "d", then a total capacitance C of the fiber felt capacitor may be estimated by an expression $C = \epsilon_o \epsilon_r 2\pi FF(R^2\tau/\phi d)$. If an operating voltage of fiber felt capacitor 100 is represented by $V_o$ volts then a specific operating charge, $Q^*$ of capacitor 100 may be expressed by $Q^* = \epsilon_o \epsilon_r 2FF(1/\phi d)V_o$. Optionally, an operating voltage is equal to about 0.6 of a voltage at which dielectric layer 32 breaks down.

Evaluating the expressions for C and $Q^*$ for the above numerical example of fiber felt capacitor 100, (for which, as noted above $FF=0.5$, $\phi=0.5\times10^{-6}$ m, $d=10\times10^{-9}$ m and $\epsilon_r=7$ for $Al_2O_3$) C is about equal to 969 μF. The 10 nm thick $Al_2O_3$ dielectric layer 32 has a breakdown voltage equal to about 8 volts and therefore fiber felt capacitor 100 may have an operating voltage $V_o$ equal to about 5 volts, and a corresponding specific operating charge $Q^*$ equal to about 62 VμF/mm$^3$.

It is noted that in general operating voltage $V_o$ is proportional to thickness d of dielectric layer 32. As a result, specific operating charge $Q^*$ is substantially independent of d. However $Q^*$ is inversely proportional to radius $\phi$ of fibers 22 and fiber felt capacitor 100 may be configured to have different values of $Q^*$ by forming layers 30-33 on fibers 22 having different radii. A fiber felt capacitor in accordance with an embodiment of the invention similar to fiber felt capacitor 100 may have a $Q^*$ greater than or less than 62 VμF/mm$^3$ by forming layers 30-33 on fibers 22 having radii less than or greater than $0.5\times10^{-6}$ m respectively. For example, forming layers 30-33 on fibers 22 having radii about equal to $0.25\times10^{-6}$ m provides a fiber felt capacitor similar to fiber felt capacitor 100 having $Q^*$ equal to about 124 VμF/mm$^3$. Forming layers 30-33 on fibers 22 having radii equal to about $50\times10^{-9}$ m provides a fiber felt capacitor similar to fiber felt capacitor 100 having $Q^*$ equal to about 620 VμF/mm$^3$.

Whereas in the figures and the above discussion a fiber felt capacitor comprising a dielectric layer sandwiched between conducting layers is shown and described, practice of embodiments of the invention is not limited to dielectric type capacitors. For example, methods and components used to provide capacitor 100 may be used to provide an electrochemical fiber felt capacitor or a fiber felt battery.

Figure 3A:
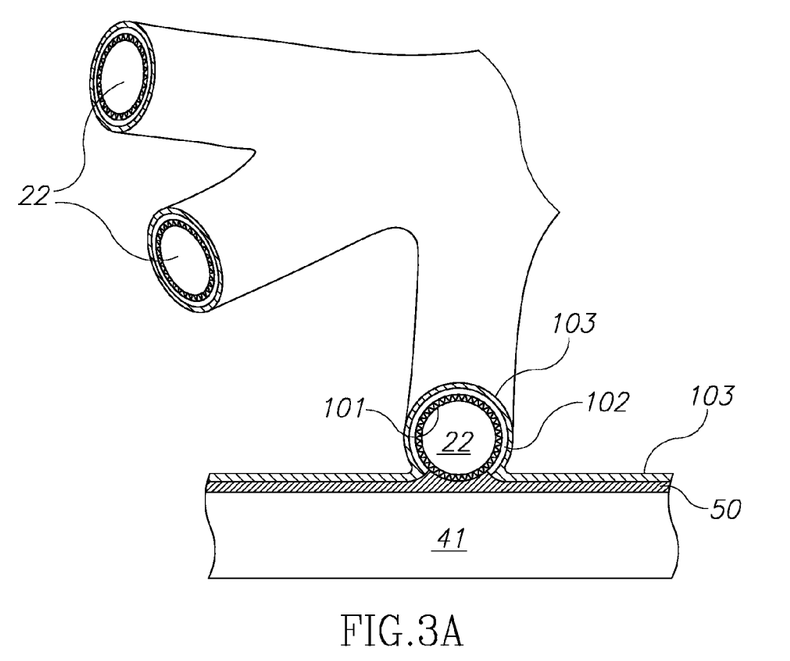
FIG. 3A schematically shows an enlarged view of the tangled fibers shown in FIG. 1D on which a cathode layer, an electrolyte layer, and an anode layer of an electrochemical fiber felt capacitor are formed, in accordance with an embodiment of the invention.

In an embodiment of the invention, a fiber felt electrochemical capacitor is produced by forming on fibers 22 of fiber felt 20 (FIG. 1C) a solid electrolyte layer sandwiched between a cathode layer and an anode layer, optionally by an ALD process. FIG. 3A schematically shows an enlarged view of tangled fibers 22 shown in FIG. 1D on which a cathode layer 101, a solid electrolyte layer 102, and an anode layer 103 comprised in an electrochemical capacitor (not shown), in accordance with an embodiment of the invention are formed on fibers 22. A terminal 41 shown in FIG. 3A provides an electrical connection to cathode layer 101 and is brazed to the cathode layer before electrolyte layer 102 is formed using an appropriate filler metal 50. A terminal (not shown) is similarly brazed to anode layer 103 to provide electrical connection to the anode layer. An insulating spacer (not shown) optionally similar to insulating spacer 60 (FIGS. 1I and 1K) electrically isolates the terminals one from the other.

Optionally, cathode layer 101 is formed on fibers 22 (FIGS. 1A-1D) from a material that may comprise at least one of: $LiFePO_4$, $LiCoO_2$, $LiMn_2O_4$, $LiNiO_2$, $LiMPO_4$, where "M" represents a metal which may be Fe, Co, Mn, or Ti; and $LiFe_{0.95}V_{0.05}PO_4$ and $A_2FePO_4$, where "A" represents Na, or Li. Solid electrolyte layer 102 is formed on cathode layer 101 and may comprise at least one of: Lithium Phosphorous Oxynitride (Lipon), Lithium Lanthanum Titanate (LLT), Beta-alumina complexed with a mobile ion such as Na+, K+, Li+, Ag+, H+, Pb2+, Sr2+ or Ba2+, non-stoichiometric Sodium Aluminate, Yttria-stabilized zirconia (YSZ) and (Li, La)$_x$Ti$_y$O$_z$. Anode layer 103 formed on the solid electrolyte layer may be formed from at least one of: $Li_4Ti_5O_{12}$, Ge($Li_{4.4}$Ge), Si($Li_{4.4}$Ge), Lithium-Titanate or Lithium Vanadium Oxide. It is noted that whereas in FIG. 3A cathode layer 101 is formed on fibers 22, the order of layers 101, 102 and 103 may be reversed, with anode layer 103 formed on fibers 22 instead of cathode layer 101.

Whereas FIG. 3A shows three layers formed on fibers 22 an electrochemical capacitor, in accordance with an embodiment of the invention is not limited to three layers. For example, an electrochemical capacitor may comprise a five layer structure in which the three layer structure schematically shown in FIG. 3A is sandwiched between conducting layers.

A fiber felt battery may be formed on fiber felt scaffolding 20 in accordance with an embodiment of the invention by forming an optionally five layer structure on fibers 22. The five layer structure may comprise first and second conductors that sandwich between them a battery anode, a solid electrolyte, and a battery cathode. If fibers 22 are sufficiently conducting, the fibers may function as the first conductor, otherwise a conducting layer of a suitable metal may be formed on fibers 22 to function as the first conductor of the battery. In an embodiment, a fiber felt battery may have a battery anode and a battery cathode that are sufficiently conducting, so that they function as first and second conductors respectively. The fiber felt battery may then comprise a three layer structure.

Figure 3B:
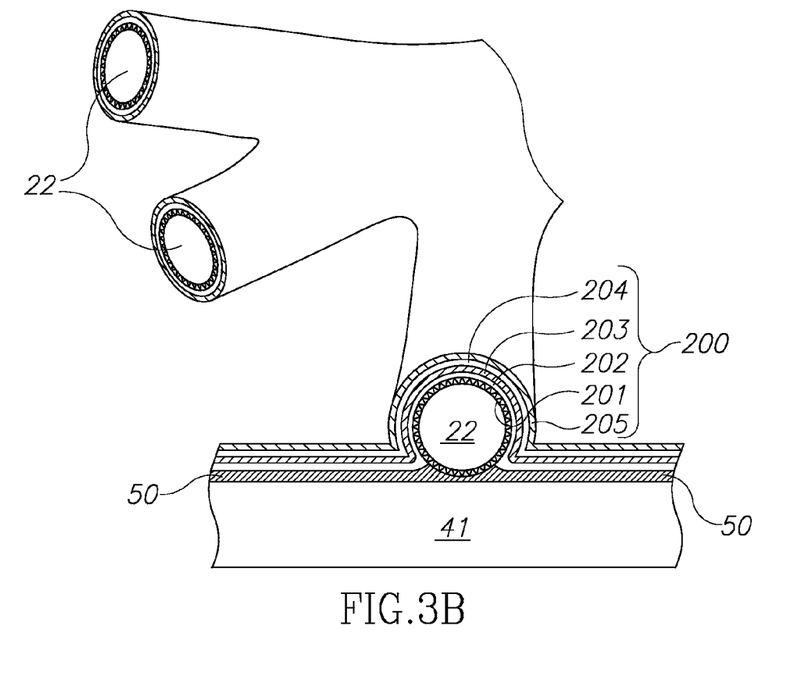
FIG. 3B schematically shows an enlarged view of the tangled fibers shown in FIG. 1D on which layers of a fiber felt battery are formed, in accordance with an embodiment of the invention.

FIG. 3B schematically shows an enlarged view of tangled fibers 22 shown in FIG. 1D on which a five layer structure 200 comprised in a fiber felt battery (not shown) in accordance with an embodiment of the invention, is formed. Five layer structure 200 optionally comprises a first conducting layer 201, a battery anode layer 202, a solid electrolyte layer 203, a battery cathode layer 204, and a second conducting layer 205. Optionally layers 201-205 are formed by ALD. A terminal 41 shown in FIG. 3B provides an electrical connection to first conducting layer 201 and is brazed to the conducting layer optionally before battery anode layer 202 is formed using an appropriate filler metal 50. A second terminal (not shown) is similarly brazed to second conducting layer 205 to provide electrical connection to the conducting layer. An insulating spacer optionally similar to insulating spacer 60 (FIGS. 1I and 1K) electrically isolates the first and second terminals one from the other.

Optionally anode layer 202 of the fiber felt battery is formed on fibers 22 and comprises at least one of $Li_4Ti_5O_{12}$, $Ge(Li_{4.4}Ge)$, $Si(Li_{4.4}Ge)$, Lithium-Titanate or Lithium Vanadium Oxide. Solid electrolyte layer 203 formed on the anode layer may comprise at least one of: Lithium Phosphorous Oxynitride (Lipon), Lithium Lanthanum Titanate (LLT), Beta-alumina complexed with a mobile ions such as Na+, K+, Li+, Ag+, H+, Pb2+, Sr2+, or Ba2+, nonstoichiometric Sodium Aluminate, Yttria stabilized zirconia (YSZ) and $(Li, La)xTiyOz$. Cathode layer 204 formed on the electrolyte layer may comprise at least one of: $LiFePO_4$, $LiCoO_2$, $LiMn_2O_4$, $LiNiO_2$, $LiMPO_4$, where M stands for a metal such as Fe, Co, Mn, Ti, and $LiFe_{0.95}V_{0.05}PO_4$. Conducting layers 201 and 205 are formed from any suitable conducting material and may comprise a metal, such as by way of example Ag, Cu, Al, W, Zn, Ni, Fe, and/or Pt. Whereas in FIG. 3B anode layer 202 is formed on conducting layer 201, the order of layers 202, 203 and 204 may be reversed, with cathode layer 202 formed on conductor 201 instead of cathode layer 202.

In an embodiment of the invention, fiber felt 20 (FIG. 1C) has a fill factor equal to about 0.5, and fibers 22 on which layer structure 200 is formed have a diameter equal to about 1 μm. Assuming fiber felt 20 is disk shaped, as shown in FIG. 1C, and has a diameter equal to about 10 mm and thickness equal to about 1 mm, fibers 22 in the fiber felt have a total surface area equal to about 1,500 cm². The battery comprising layer structure 200 has an ion transport cross section substantially equal to the total surface area of fibers 22, and is therefore also equal to about 1,500 cm². Optionally, cathode and anode layers 202 and 204 have thickness equal to about 100 nm and electrolyte layer 203 has a thickness between about 10 nm and about 50 nm. An ion transport distance of the battery may therefore be estimated as being equal to between about 100 nm and 200 nm.

A conventional button battery may have an ion transport cross section of about 1 cm² and an ion transport distance equal to about 0.5 mm. Therefore a battery in accordance with an embodiment of the invention having dimension similar to those given in the preceding paragraph may be expected to have an internal ion transport resistance at least, $1/10^6$ that of conventional batteries.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Descriptions of embodiments of the invention in the present application are provided by way of example and are not intended to limit the scope of the invention. The described embodiments comprise different features, not all of which are required in all embodiments of the invention. Some embodiments utilize only some of the features or possible combinations of the features. Variations of embodiments of the invention that are described, and embodiments of the invention comprising different combinations of features noted in the described embodiments, will occur to persons of the art. The scope of the invention is limited only by the claims.

The invention claimed is:

1. An electrical component that provides an electrical functionality, the component comprising:
    a fiber felt comprising a tangle of electrically conducting fibers and characterized by a fill factor;
    a first layer formed on the fibers and comprising an electrically conducting material; and
    a second layer formed on the fibers and comprising a dielectric material that underlies the first layer.

2. An electrical component according to claim 1 wherein the layers are formed by atomic layer deposition (ALD).

3. An electrical component according to claim 1 wherein the fibers have a radius less than or equal to about 1 micron.

4. An electrical component according to claim 3 wherein the fibers have a radius less than or equal to about 500 nm (nanometers).

5. An electrical component according to claim 4 wherein the fibers have a radius less than or equal to about 100 nm.

6. An electrical component according to claim 1 wherein the fill factor is greater than or equal to about 0.4.

7. An electrical component according to claim 6 wherein the fill factor is greater than or equal to about 0.5.

8. An electrical component according to claim 1 and comprising a first terminal electrically connected to the first layer and a second terminal electrically connected to the electrically conductive fiber.

9. An electrical component according to claim 8 wherein the fill factor and layers formed on the fibers are configured to have a specific operating charge of the fiber felt that is greater than or equal to about 20 VμF/mm³, wherein the specific operating charge is equal to an amount of charge stored per mm³ of the fiber felt volume for a voltage between the first and second terminals that is about 0.6 times a voltage at which the dielectric layer between the first and second layers breaks down.

10. An electrical component according to claim 9 wherein the specific operating charge is greater than or equal to about 120 VμF/mm³.

11. An electrical component according to claim 1 wherein the conductive fibers comprise fibers formed from an electrically non-conducting material and an electrically conducting coating formed on the fibers.

12. An electrical component according to claim 1, wherein the conductive fibers are formed from an electrically conducting material.

13. An electrical component that provides an electrical functionality, the component comprising:
    a fiber felt comprising a tangle of electrically conducting fibers and characterized by a fill factor;

a first layer formed on the fibers and comprising an electrically conducting material; and a second layer formed on the fibers and comprising a solid electrolyte that underlies the first layer.

14. An electrical component according to claim 13 wherein when a voltage difference is applied between the first layer and the electrically conducting fibers, a charge double-layer is formed at a first interface between the electrically conducting fibers and the second layer and a second interface between the second layer and the first layer.

15. An electrical component according to claim 13 wherein materials in the solid electrolyte of the second layer react with materials in the electrically conducting fibers and the electrically conducting first layer to undergo oxidation and reduction reactions.

16. An electrical component according to claim 13 wherein the layers are formed by atomic layer deposition (ALD).

17. An electrical component according to claim 13 wherein the fibers have a radius less than or equal to about 1 micron.

18. An electrical component according to claim 17 wherein the fibers have a radius less than or equal to about 500 nm (nanometers).

19. An electrical component according to claim 18 wherein the fibers have a radius less than or equal to about 100 nm.

20. An electrical component according to claim 13 wherein the fill factor is greater than or equal to about 0.4.

21. An electrical component according to claim 20 wherein the fill factor is greater than or equal to about 0.5.

22. An electrical component according to claim 13 wherein the conductive fibers comprise fibers formed from an electrically non-conducting material and an electrically conducting coating formed on the fibers.

23. An electrical component according to claim 13, wherein the conductive fibers are formed from an electrically conducting material.

* * * * *